US010204419B2

(12) United States Patent
Jing et al.

(10) Patent No.: US 10,204,419 B2
(45) Date of Patent: Feb. 12, 2019

(54) MONITORING METHOD AND MONITORING DEVICE

(71) Applicant: BOE TECHNOLOGY GROUP CO., LTD., Beijing (CN)

(72) Inventors: Yaoqiu Jing, Beijing (CN); Chengqi Zhou, Beijing (CN); Hong Wang, Beijing (CN); Shou Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 9 days.

(21) Appl. No.: 15/238,965

(22) Filed: Aug. 17, 2016

(65) Prior Publication Data

US 2017/0263001 A1 Sep. 14, 2017

(30) Foreign Application Priority Data

Mar. 9, 2016 (CN) .......................... 2016 1 0133111

(51) Int. Cl.
*G06T 7/20* (2017.01)
*H04N 7/18* (2006.01)
*H04N 5/77* (2006.01)

(52) U.S. Cl.
CPC ............... *G06T 7/20* (2013.01); *H04N 5/77* (2013.01); *H04N 7/188* (2013.01); *G06T 2207/10016* (2013.01); *G06T 2207/30232* (2013.01)

(58) Field of Classification Search
CPC ............ G06T 7/20; G06T 2207/10016; G06T 2207/30232; H04N 5/77; H04N 7/188
See application file for complete search history.

(56) References Cited

U.S. PATENT DOCUMENTS

2002/0006163 A1* 1/2002 Hibi ................. G08B 13/19669
375/240.16
2005/0104864 A1* 5/2005 Zhang ................... G06F 3/017
345/173
(Continued)

FOREIGN PATENT DOCUMENTS

CN      101281649 A    10/2008
CN      101799928 A     8/2010
(Continued)

OTHER PUBLICATIONS

English translation of JP2003259339A.*
Office Action dated Apr. 3, 2018 issued in corresponding Chinese Application No. 201610133111.9.

*Primary Examiner* — Jon Chang
(74) *Attorney, Agent, or Firm* — Nath, Goldberg & Meyer; Joshua B. Goldberg

(57) ABSTRACT

The present invention provides a monitoring method and a monitoring device, belongs to the field of electronic monitoring technology, and can solve the problem that useless video data occupies storage space and key video cannot be extracted quickly when an event occurs in the existing monitoring device. The monitoring method of the present invention comprises: determining whether or not a first image is changed; generating a storage instruction if it is determined that the first image is changed; collecting and storing images of external environment according to the storage instruction; obtaining a second image according to the collected images of external environment; determining whether or not the second image is changed; and stopping storing images of external environment if it is determined that the second image is not changed.

8 Claims, 3 Drawing Sheets

(56) References Cited

U.S. PATENT DOCUMENTS

| | | | |
|---|---|---|---|
| 2008/0001938 A1* | 1/2008 | Sakai | H04N 5/77 345/204 |
| 2008/0119691 A1* | 5/2008 | Yagi | A61B 1/00009 600/109 |
| 2010/0245615 A1* | 9/2010 | Shimizu | G06T 5/009 348/222.1 |

FOREIGN PATENT DOCUMENTS

| | | | |
|---|---|---|---|
| CN | 102075735 A | | 5/2011 |
| CN | 103327306 A | | 9/2013 |
| CN | 104301690 A | | 1/2015 |
| CN | 104702914 A | | 6/2015 |
| JP | 2003-259339 A | | 9/2003 |
| JP | 2003259339 A | * | 9/2003 |

* cited by examiner

MONITORING METHOD AND MONITORING DEVICE

CROSS-REFERENCE TO RELATED APPLICATION

The present application claims priority to Chinese Patent Application No. 201610133111.9 filed on Mar. 9, 2016, the disclosure of which is hereby incorporated by reference in its entirety.

TECHNICAL FIELD

The present invention belongs to the field of electronic monitoring technology, and particularly relates to a monitoring method and a monitoring device.

BACKGROUND

Nowadays, in public places such as banks and shopping malls, monitoring devices, e.g., probes, cameras, etc., can usually be seen at ceilings or corners, and are used for supervising people's behavior. In general, common monitoring devices collect image signals, and people can know the process, cause, and specific situation of an event that has occurred from image data recorded by a monitoring device. For example, traffic police can reproduce the course of a traffic accident that has occurred according to images recorded by a road monitoring probe, policemen can track down a suspect's escape route by means of a bank or road monitoring probe, etc. These monitoring devices play an important role in monitoring and reproducing an event that has occurred in people's living environment, so to speak.

However, at least the following problems exist in the prior art: in practical applications, a monitoring device needs to store a large amount of video data every day, and most of the video data may be useless and thus wastes the storage space of a hard disk of the monitoring device to a great extent, and in the meanwhile, when an event occurs, related personnel cannot extract key video data quickly.

SUMMARY

In view of the problem that useless video data occupies storage space and key video cannot be extracted quickly when an event occurs in the existing monitoring device, the present invention provides a monitoring method and a monitoring device, which can effectively save storage space and facilitate quick extraction of key video.

In one aspect, the present invention provides a monitoring method, comprising:
determining whether or not a first image is changed;
generating a storage instruction if it is determined that the first image is changed;
collecting and storing images of external environment according to the storage instruction;
obtaining a second image according to the collected images of external environment;
determining whether or not the second image is changed; and
stopping storing images of external environment if it is determined that the second image is not changed.

Optionally, before determining whether or not a first image is changed, the monitoring method further comprises:
collecting images of external environment by way of videotaping, and obtaining the first image according to the collected images of external environment.

Optionally, determining whether or not a first image is changed comprises:
sequentially obtaining a difference between every two adjacent frames of images among the first image and at least a predetermined frame of image previous to the first image, and then cumulatively adding the obtained differences to obtain a first target moving dimension; and
determining whether or not the first target moving dimension exceeds a first target moving dimension threshold;
generating a storage instruction if it is determined that the first image is changed comprises:
generating the storage instruction if the first target moving dimension exceeds the first target moving dimension threshold.

Optionally, sequentially obtaining a difference between every two adjacent frames of images among the first image and at least a predetermined frame of image previous to the first image and then cumulatively adding the obtained differences specifically comprises:
among the first image and at least the predetermined frame of image previous to the first image, sequentially comparing a latter frame of image with a former frame of image in every two adjacent frames of images to obtain a difference between pixel brightness values at same positions of the latter frame of image and the former frame of image, and then cumulatively adding the obtained differences to obtain the first target moving dimension.

Optionally, collecting and storing images of external environment according to the storage instruction comprises:
collecting images of external environment by way of both videotaping and photographing, and storing the images collected by way of both videotaping and photographing.

Optionally, collecting images of external environment by way of photographing is stopped, if it is determined that the second image is not changed.

Optionally, whether or not the second image is changed is determined by using images collected by way of videotaping; and determining whether or not the second image is changed comprises:
sequentially obtaining a difference between every two adjacent frames of images among the second image and at least a predetermined frame of image previous to the second image, and then cumulatively adding the obtained differences to obtain a second target moving dimension; and
determining whether or not the second target moving dimension exceeds a second target moving dimension threshold;
stopping storing images of external environment if it is determined that the second image is not changed comprises:
stopping storing images of external environment if the second target moving dimension does not exceed the second target moving dimension threshold.

Optionally, it is determined, by using images collected by way of photographing, whether or not the second image is changed, and determining whether or not the second image is changed comprises:
it is determined, by any one method of sum of absolute values of corresponding pixel differences in an image sequence, sum of squares of corresponding pixel differences in an image sequence, normalized cross correlation and Census transformation, whether or not the second image is changed.

In another aspect, the present invention further provides a monitoring device, comprising:
a first determination module used for determining whether or not a first image is changed;

a generation module used for generating a storage instruction when the first determination module determines that the first image is changed;

a collection module used for collecting images of external environment according to the storage instruction;

a storage module used for storing images of external environment according to the storage instruction:

an obtaining module used for obtaining a second image according to the collected images of external environment;

a second determination module used for determining whether or not the second image is changed; and a termination module used for stopping storing images of external environment when the second determination module determines that the second image is not changed.

Optionally, the collection module comprises a videotaping module which is used for collecting images of external environment by way of videotaping, and the obtaining module is further used for obtaining the first image according to images of external environment collected by the videotaping module.

Optionally, the first determination module is specifically used for sequentially obtaining a difference between every two adjacent frames of images among the first image and at least a predetermined frame of image previous to the first image, then cumulatively adding the obtained differences to obtain a first target moving dimension, and is also used for determining whether or not the first target moving dimension exceeds a first target moving dimension threshold; and the generation module is specifically used for generating a storage instruction when the first target moving dimension exceeds the first target moving dimension threshold.

Optionally, for the first image and at least the predetermined frame of image previous to the first image, the first determination module sequentially compares a latter frame of image with a former frame of image in every two adjacent frames of images to obtain a difference between pixel brightness values at same positions of the latter frame of image and the former frame of image, and then cumulatively adds the obtained differences to obtain the first target moving dimension.

Optionally, the collection module further comprises a photographing module used for collecting images of external environment by way of photographing, and the collection module is used for collecting images of external environment by means of both the videotaping module and the photographing module according to the storage instruction, and the storage module is used for storing the images of external environment collected by the videotaping module and the photographing module according to the storage instruction.

Optionally, the second determination module determines whether or not the second image is changed by using the images collected by the videotaping module.

Optionally, the second determination module sequentially obtains a difference between every two adjacent frames of images among the second image and at least a predetermined frame of image previous to the second image, then cumulatively adds the obtained differences to obtain a second target moving dimension, and determines whether or not the second target moving dimension exceeds a second target moving dimension threshold;

the termination module is specifically used for stopping storing images of external environment when the second target moving dimension does not exceed the second target moving dimension threshold.

Optionally, the second determination module determines whether or not the second image is changed by using the images collected by the photographing module.

Optionally, the second determination module determines, by any one method of sum of absolute values of corresponding pixel differences in an image sequence, sum of squares of corresponding pixel differences in an image sequence, normalized cross correlation and Census transformation, whether or not the second image is changed.

Optionally, the termination module is used for stopping the collection module from collecting images of external environment by means of the photographing module when the second determination module determines that the second image is not changed.

The present invention provides a monitoring method and a monitoring device, and the monitoring method includes: determining whether or not the first image is changed; generating a storage instruction if it is determined that the first image is changed; collecting and storing images of external environment according to the storage instruction; obtaining the second image according to the collected images of external environment; determining whether or not the second image is changed; stopping storing images of external environment if it is determined that the second image is not changed. That is to say, in the present method, when the second image is not changed, the second image and images subsequent thereto are not photographed and stored; when the scene in the image is changed, the storage and photographing functions may start working automatically, and when the scene in the image stops changing, the storage and photographing functions may stop working automatically. In this way, the storage space in the monitoring device is saved, thus the duration of shooting is prolonged, and in the meanwhile, related personnel can extract valuable videos and photographs quickly.

DETAILED DESCRIPTION

To enable those skilled in the art to understand technical solutions of the present invention better, the present invention will be further described in detail below in conjunction with the accompanying drawings and specific implementations.

Figure 1:
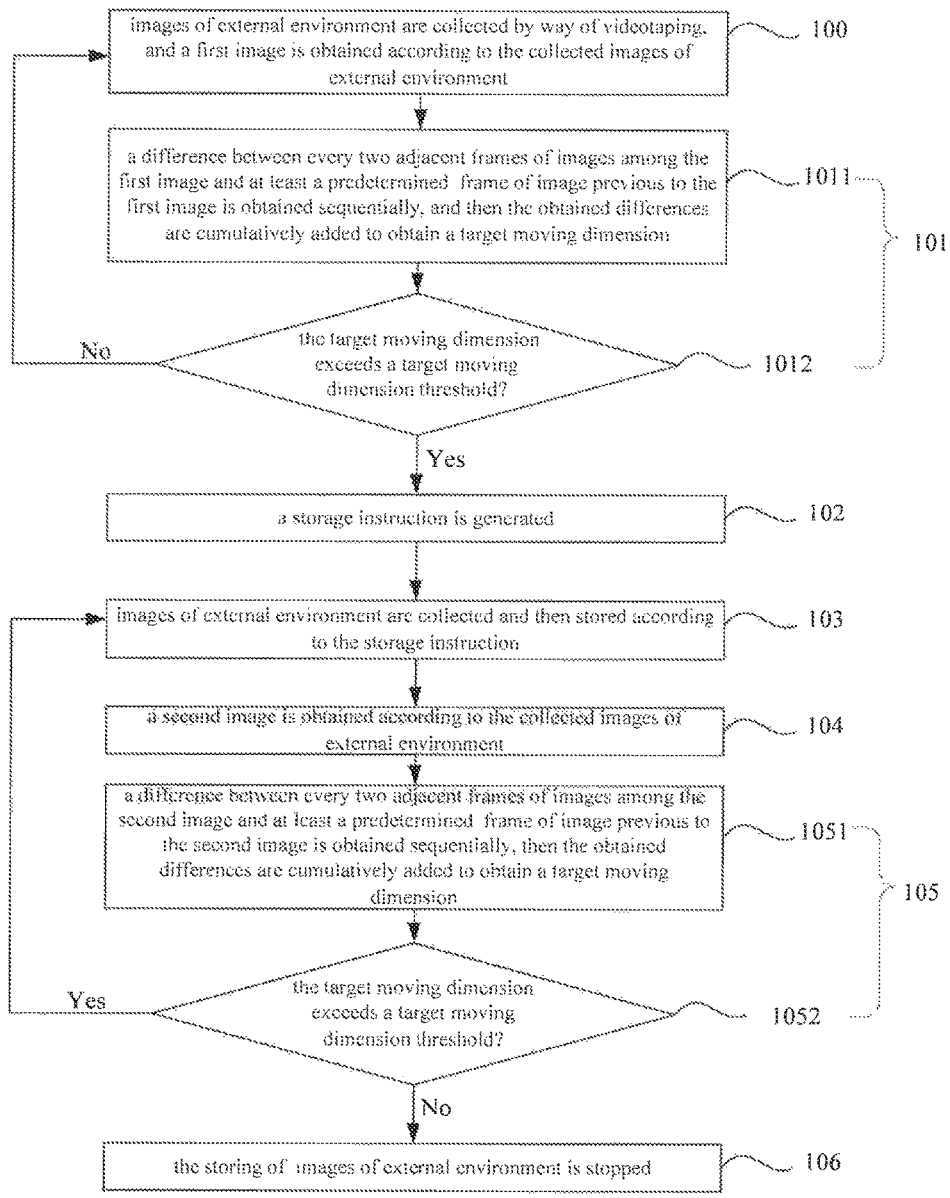
FIG. 1 is a schematic flow chart of a monitoring method according to an embodiment of the present invention.

FIG. 1 is a schematic flow chart of a monitoring method according to an embodiment of the present invention. Referring to FIG. 1, the monitoring method provided by the embodiment includes the following steps.

At step 100, images of external environment are collected by way of videotaping, and a first image is obtained according to the collected images of external environment.

It needs to be noted that, in this step, images of external environment collected by way of videotaping are buffered only, but not stored, and the number of frames of the buffered images is small. Therefore, only a small amount of storage space, instead of a large amount of storage space, may be occupied, and thus the storage space in the monitoring device can be effectively saved. In addition, the first image used herein refers to an image suspected to change suddenly. For example, in a case where images of the inside of a cash withdrawal hall of a bank are collected by way of videotaping, images regarding normal activity behavior of customers are collected, but not stored, and if a crime suspect robs a customer of his/her belongings suddenly, an image corresponding to the time when this event occurs suddenly is referred to as the first image.

At step 101, it is determined whether or not the first image is changed; if it is determined that the first image is changed, it proceeds to step 102, and if it is determined that there is no change in the first image, it returns back to step 100. Step 101 may specifically include the following steps 1011 and 1012.

At step 1011, a difference between every two adjacent frames of images among the first image and at least a predetermined frame of image previous to the first image is obtained sequentially, and the obtained differences are cumulatively added to obtain a target moving dimension.

In general, the predetermined frame of image includes at least 8 frames of images. If the number of the predetermined frame of image is less than 8, misjudgment is very likely to occur; and if the number of the predetermined frame of image is too large, e.g. 30 frames or 40 frames, it will be a waste of storage resource when they are all stored in the hard disk.

Specifically, by taking the case that the predetermined frame of image includes 8 frames of images as an example, for the first image and the 8 frames of images previous to the first image, a latter frame of image is compared with a former frame of image in every two adjacent frames sequentially. Specifically, differences between pixel brightness values at same positions of the latter frame of image and the former frame of image are obtained, then the obtained differences are cumulatively added, and the target moving dimension is obtained according to the result of the cumulative addition.

Needless to say, the number of the predetermined frame of image is not limited thereto, and whether the first image is changed may be determined by using other number of frames, as long as the purpose of avoiding misjudgment and occupying the storage space in the monitoring device as little as possible can be achieved, which is not described herein.

At step 1012, it is determined whether or not the target moving dimension exceeds a target moving dimension threshold; if it is determined that the target moving dimension exceeds the target moving dimension threshold, it proceeds to step 102, and if it is determined that the target moving dimension does not exceed the target moving dimension threshold, it returns back to step 100. That is to say, if the target moving dimension exceeds the target moving dimension threshold, it indicates that the first image is changed; if the target moving dimension does not exceed the target moving dimension threshold, it indicates that the first image is not changed.

At step 102, a storage instruction is generated.

Here, the storage instruction refers to an instruction which instructs to start storing images of external environment, that is, the storage instruction instructs to store the first image and images of external environment collected subsequently thereto.

Specifically, when the target moving dimension exceeds the target moving dimension threshold, it is determined that the first image is changed, and the storage instruction which instructs to start storing images of external environment is generated, so as to store the first image and the images subsequent thereto.

At step 103, images of external environment are collected and then stored according to the storage instruction.

It can be understood that images of external environment are collected by way of videotaping all the time. Before the storage instruction is generated, images of external environment are only collected, by way of videotaping, but are not stored. After the storage instruction is generated, images of external environment are still collected by way of videotaping and the images collected by way of videotaping (i.e., videos) are stored.

At step 104, a second image is obtained according to the collected images of external environment.

The second image used herein refers to an image suspected to stop changing. For example, in the case where images of the inside of a cash withdrawal hall of a bank are collected by way of videotaping, if a crime suspect escapes from the cash withdrawal hall after robbing a customer of his/her belongings, the image corresponding to the time when the crime suspect leaves the cash withdrawal hall is referred to as the second image.

At step 105, it is determined whether or not the second image is changed; if it is determined that the second image is changed, it returns back to step 103, and if it is determined that the second image is not changed, it proceeds to step 106.

In the present embodiment, whether or not the second image is changed is determined according to the images collected by way of videotaping. Specifically, step 105 may include the following steps 1051 and 1052.

At step 1051, a difference between every two adjacent frames of images among the second image and at least a predetermined frame of image previous to the second image is obtained sequentially, and the obtained differences are cumulatively added to obtain a target moving dimension.

In general, the predetermined frame of image includes at least 8 frames of images. If the number of the predetermined frame of image is less than 8, misjudgment is very likely to occur, and if the number of the predetermined frame of image is too large, e.g. 30 frames or 40 frames, it will be a waste of storage resource when they are all stored in the hard disk.

Specifically, by taking the case that the predetermined frame of image includes 8 frames of images as an example, for the second image and the 8 frames of images previous to the second image, a latter frame of image is compared with a former frame of image in every two adjacent frames sequentially. Specifically, differences between pixel brightness values at same positions of the latter frame of image and the former frame of image are obtained, then the obtained differences are cumulatively added, and the target moving dimension is obtained according to the result of the cumulative addition.

Needless to say, the number of the predetermined frame of image is not limited thereto, and whether the second image is changed may be determined by using other number of frames, as long as the purpose of avoiding misjudgment and occupying the storage space in the monitoring device as little as possible can be achieved, which is not described herein.

At step 1052, it is determined whether or not the target moving dimension exceeds a target moving dimension threshold; if the target moving dimension exceeds the target moving dimension threshold, it returns back to step 103, and the target moving dimension does not exceed the target moving dimension threshold, it proceeds to step 106. That is to say, if the target moving dimension exceeds the target moving dimension threshold, it indicates that the second image is changed; if the target moving dimension does not exceed the target moving dimension threshold, it indicates that the second image is not changed.

At step 106, the storing of the collected images of external environment is stopped.

Here, 'the storing of the collected images of external environment is stopped' means the storing of the second image and the images collected subsequently thereto is stopped. Specifically, when the target moving dimension does not exceed the target moving dimension threshold, it is determined that the second image is not changed, and the storing of the images of external environment collected by way of videotaping is stopped. It needs to be noted that, when it is determined that the second image is not changed, the storing of the collected images of external environment is stopped, but the function of videotaping still remains on; however, the images of external environment collected by way of videotaping are collected and buffered, but not stored.

In other words, in the monitoring method of the present embodiment, only the images regarding the process of an event (i.e., from the beginning to the end of the event) are stored, and useless images (i.e., images irrelevant to the event) are not stored, which not only saves storage space of the monitoring device and thus prolongs duration of shooting, but also enables related personnel to extract valuable image data quickly.

The monitoring method of the present embodiment includes: determining whether or not the first image is changed; generating a storage instruction if it is determined that the first image is changed; collecting and storing images of external environment according to the storage instruction; obtaining the second image according to the collected images of external environment; determining whether or not the second image is changed; stopping storing if it is determined that the second image is not changed. That is to say, in the present method, when the second image is not changed, the second image and images subsequent thereto are not stored; when the scene in the image is changed, the storage function may start working automatically, and when the scene in the image stops changing, the storage function may stop working automatically. In this way, the storage space in the monitoring device is saved, thus the duration of shooting is prolonged, and in the meanwhile, related personnel can extract valuable image data quickly.

Figure 2:
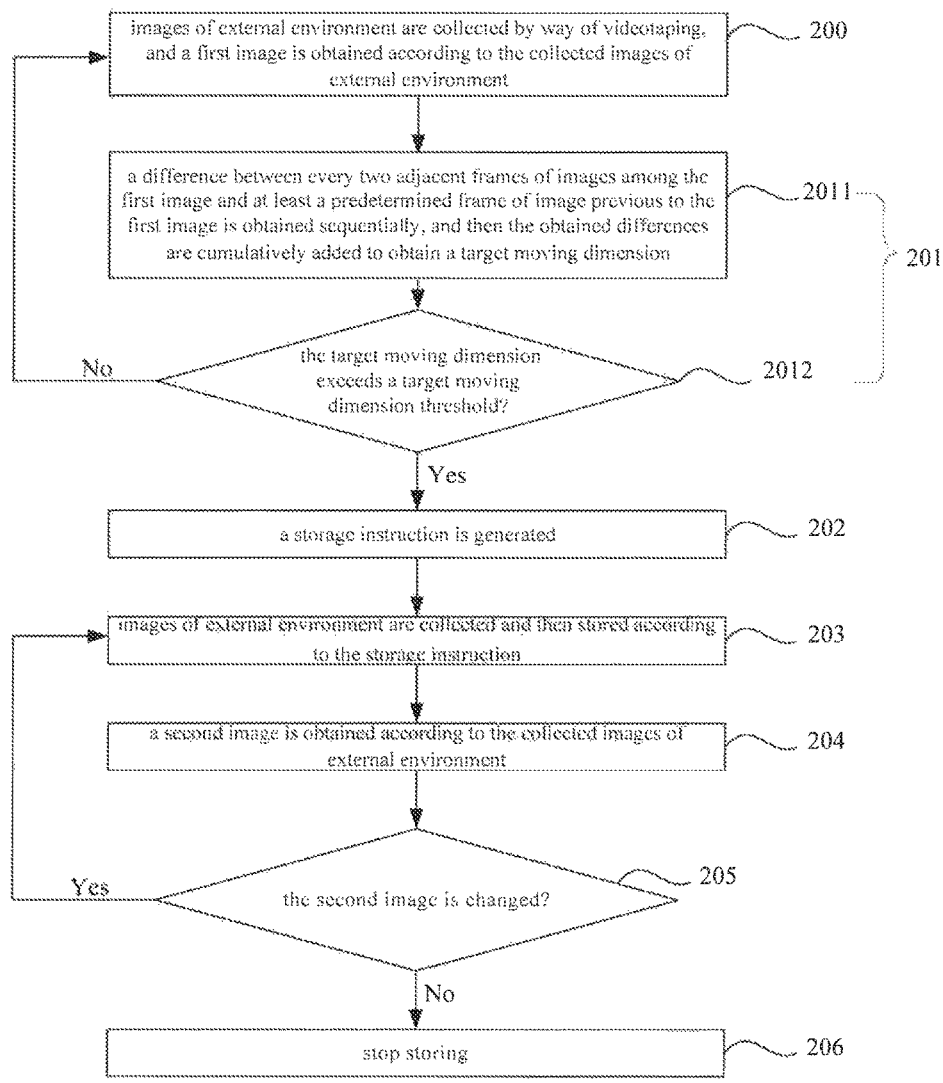
FIG. 2 is a schematic flow chart of a monitoring method according to an embodiment of the present invention.

FIG. 2 is a schematic flow chart of another monitoring method according to an embodiment of the present invention. Referring to FIG. 2, the monitoring method provided by the embodiment includes the following steps.

At step 200, images of external environment are collected by way of videotaping, and a first image is obtained according to the collected images of external environment.

It needs to be noted that, in this step, images of external environment collected by way of videotaping are buffered only, but not stored, and the number of frames of the buffered images is small. Therefore, only a small amount of storage space, instead of a large amount of storage space, may be occupied, and thus the storage space in the monitoring device can be effectively saved. In addition, the first image used herein refers to an image suspected to change suddenly. For example, in a case where images of the inside of a cash withdrawal hall of a bank are collected by way of videotaping, images regarding normal activity behavior of customers are collected, but not stored, and if a crime suspect robs a customer of his/her belongings suddenly, an image corresponding to the time when this event occurs suddenly is referred to as the first image.

At step 201, it is determined whether or not the first image is changed; if it is determined that the first image is changed, it proceeds to step 202, and if it is determined that the first image is not changed, it returns back to step 200. Step 201 may specifically include steps 2011 and 2012.

At step 2011, a difference between every two adjacent frames of images among the first image and at least a predetermined frame of image previous to the first image is obtained sequentially, and the obtained differences are cumulatively added to obtain a target moving dimension.

In general, the predetermined frame of image includes at least 8 frames of images. If the number of the predetermined frame of image is less than 8, misjudgment is very likely to occur; and if the number of the predetermined frame of image is too large, e.g. 30 frames or 40 frames, it will be a waste of storage resource when they are all stored in the hard disk.

Specifically, by taking the case that the predetermined frame of image includes 8 frames of images as an example, for the first image and the 8 frames of images previous to the first image, a latter frame of image is compared with a former frame of image in every two adjacent frames sequentially. Specifically, differences between pixel brightness values at same positions of the latter frame of image and the former frame of image are obtained, then the obtained differences are cumulatively added, and the target moving dimension is obtained according to the result of the cumulative addition.

Needless to say, the number of the predetermined frame of image is not limited thereto, and whether the first image is changed may be determined by using other number of frames, as long as the purpose of avoiding misjudgment and occupying the storage space in the monitoring device as little as possible can be achieved, which is not described herein.

At step 2012, it is determined whether or not the target moving dimension exceeds a target moving dimension threshold; if it is determined that the target moving dimension exceeds the target moving dimension threshold, it proceeds to step 202, and if it is determined that the target moving dimension does not exceed the target moving dimension threshold, it returns back to step 200. That is to say, if the target moving dimension exceeds the target moving dimension threshold, it indicates that the first image is changed; if the target moving dimension does not exceed the target moving dimension threshold, it indicates that the first image is not changed.

At step 202, a storage instruction is generated.

Here, the storage instruction refers to an instruction which instructs to start storing images of external environment, that is, the storage instruction instructs to store the first image and images of external environment collected subsequently thereto.

Specifically, when the target moving dimension exceeds the target moving dimension threshold, it is determined that the first image is changed, and the storage instruction which instructs to start storing images of external environment is generated, so as to store the first image and the images subsequent thereto.

At step 203, images of external environment are collected by way of both videotaping and photographing, and the images of external environment collected by way of both videotaping and photographing are then stored according to the storage instruction. It can be understood that images of external environment are collected by way of videotaping all the time. Before the storage instruction is generated, images of external environment are collected only by way of videotaping, and are not stored, but after the storage instruction is generated, images of external environment are collected by way of both videotaping and paragraphing, and the images collected by way of both videotaping and paragraphing (i.e., videos and photographs) are all stored.

At step 204, a second image is obtained according to the collected images of external environment.

The second image used herein refers to an image suspected to stop changing. For example, in the case where images of the inside of a cash withdrawal hall of a bank are collected by way of both videotaping and paragraphing, if a crime suspect escapes from the cash withdrawal hall after robbing a customer of his/her belongings, the image corresponding to the time when the crime suspect leaves the cash withdrawal hall is referred to as the second image.

At step 205, it is determined whether or not the second image is changed; if it is determined that the second image is changed, it returns back to step 203, and if it is determined that the second image is not changed, it proceeds to step 206. In the present embodiment, whether the second image is changed may be determined according to the images collected by way of photographing.

Specifically, it is determined whether or not the second image is changed by any one method of sum of absolute values of corresponding pixel differences in an image sequence (Sum of Absolute Differences, SAD), sum of squares of corresponding pixel differences in an image sequence (Sum of Squared Differences, SSD), normalized cross correlation (NCC) and Census transformation.

Figure 3:
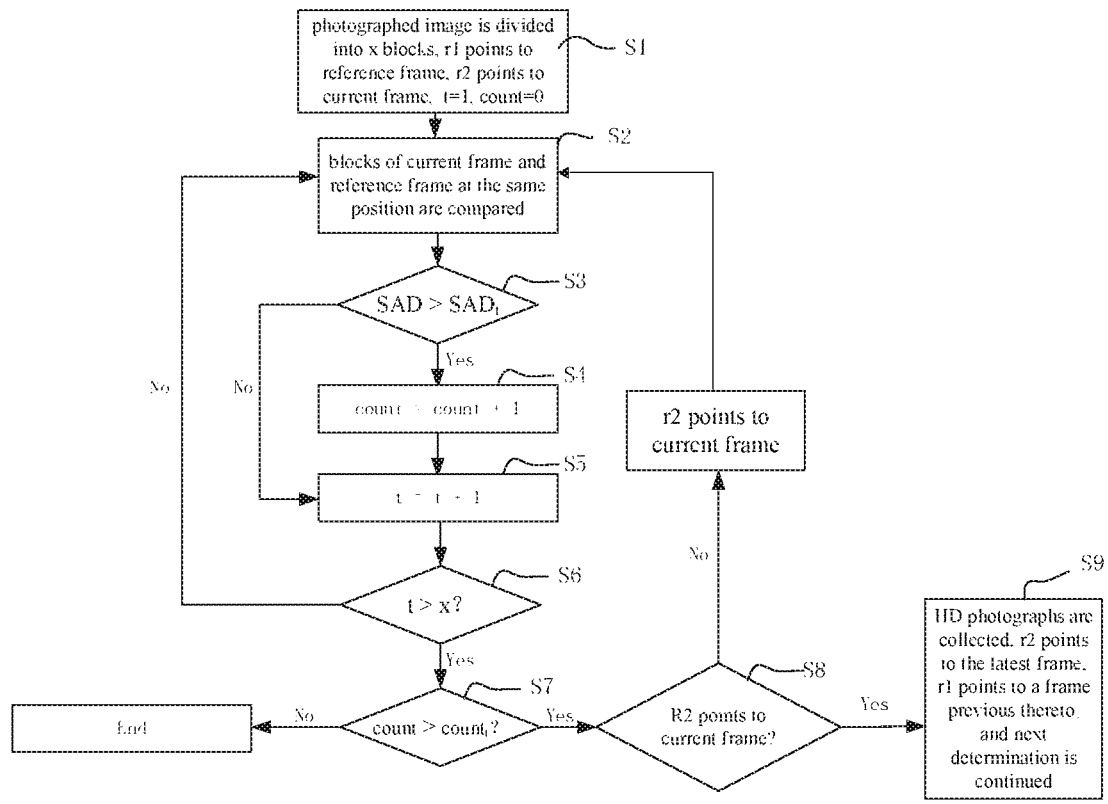
FIG. 3 is a schematic flow chart of an SAD method adopted in a monitoring method according to an embodiment of the present invention.

FIG. 3 is a schematic flow chart in which an SAD method is adopted to determine whether or not the second image is changed. Referring to FIG. 3, the specific determination process includes the following steps.

At step S1, the photographed image is divided into x blocks, wherein the number of each of the x blocks is denoted by t, a pointer r2 points to a current frame (the latest frame that is photographed), and a pointer r1 points to a reference frame (a frame immediately previous to the latest frame). For example, the fifth block of the x blocks is labeled as t=5. At an initial state, t=1.

At step S2, blocks (the t-th blocks), at a same position, of the current frame that the pointer r2 points to and the reference frame that the pointer r1 points to are compared. For example, when the current frame that the pointer r2 points to and the reference frame that the pointer r1 points to are compared, a sum of absolute values (SAD value) of respective pixel differences between the t-th block in the current frame that the pointer r2 points to and the t-th block in the reference frame that the pointer r1 points to is compared with a predetermined value $SAD_t$.

At step S3, if the SAD value of the t-th block in the current frame that the pointer r2 points to with respect to the t-th block in the reference frame that the pointer r1 points to is larger than the predetermined value $SAD_t$, it indicates that the comparison is effective, and it proceeds to step S4; if the SAD value of the t-th block in the current frame that the pointer r2 points to with respect to the t-th block in the reference frame that the pointer r1 points to is smaller than or equal to the predetermined value $SAD_t$, it proceeds to step S5.

At step S4, the value of 'count' is added by one, wherein the item 'count' is used for recording the number of blocks with effective comparison, and at an initial state, count=0.

At step S5, the value of t is added by one.

At step S6, it is determined whether or not all of the x blocks in the current frame that the pointer r2 points to have been respectively compared with the x blocks in the reference frame that the pointer r1 points to, that is, it is determined whether or not the condition of t>x is satisfied. If it is determined that t>x, it proceeds to step S7, and if it is determined that t≤x, it returns back to step S2 to perform a comparison process for a next block until all the blocks complete comparison. In the comparison for each block, steps S3 to S5 are performed, which are not described here.

At step S7, the value of 'count' is compared with a predetermined value $count_t$; if count>$count_t$, it proceeds to step S8, and if count≤$count_t$, the process is ended, and at this time, collecting images of external environment by way of photographing is stopped, and storing images of external environment collected by way of both videotaping and photographing is stopped, i.e., the storing of the second image and images of external environment collected subsequently thereto is stopped.

At step S8, it is checked whether the pointer r2 points to the current frame; if the pointer r2 points to the current frame, it proceeds to step S9, and if the pointer r2 does not point to the current frame, the pointer r2 is made to point to the current frame and it returns back to step S2. Step S8 is performed to avoid obtaining a wrong determination result when the pointer r2 does not point to the current frame.

At step S9, it continues photographing HD photographs, the pointer r1 is made to point to the frame that the pointer r2 points to, the pointer r2 is made to point to the latest photographed frame (i.e., the latest frame), and it continues with a next determination process, that is, steps S2 to S9 are performed repeatedly.

It should be noted that, when it is determined that the second image is not changed (count≤$count_t$), storing images of external environment collected by way of both videotaping and photographing is stopped, the photographing function stops working automatically, the videotaping function still remains on, and images of external environment collected by way of videotaping are buffered only, but not stored.

In other words, in the monitoring method of the present embodiment, only the images regarding the process of an event (i.e., from the beginning to the end of the event) are stored, and useless images (i.e., images irrelevant to the event) are not stored, which not only saves storage space of the monitoring device and thus prolongs the duration of shooting, but also enables related personnel to extract valuable image data quickly.

The monitoring method of the present embodiment includes: determining whether or not the first image is changed; generating a storage instruction if it is determined that the first image is changed, collecting and storing images of external environment according to the storage instruction; obtaining the second image according to the collected images of external environment; determining whether or not the second image is changed; and stopping storing if it is determined that the second image is not changed. That is to say, in the present method, when the second image is not changed, the second image and images subsequent thereto are not photographed and stored; when the scene in the image is changed, the photographing and storage functions may start working automatically, and when the scene in the image stops changing, the photographing and storage functions may stop working automatically. In this way, the storage space in the monitoring device is saved, thus the duration of shooting is prolonged, and in the meanwhile, related personnel can extract valuable videos and photographs quickly. Furthermore, by collecting images of external environment by way of photographing and storing the images of external environment collected by way of photographing, clearer and valuable image data can be obtained.

Figure 4:
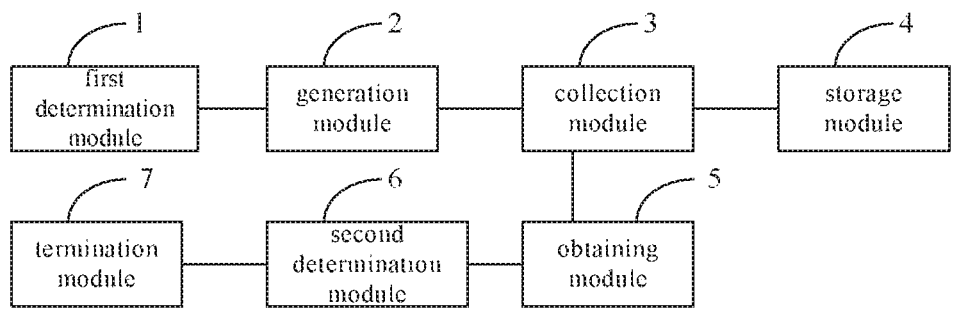
FIG. 4 is a schematic structure diagram of a monitoring device according to an embodiment of the present invention.

FIG. 4 is a schematic structure diagram of a monitoring device according to an embodiment of the present invention. Referring to FIG. 4, the monitoring device provided by the embodiment includes: a first determination module 1, a generation module 2, a collection module 3, a storage module 4, an obtaining module 5, a second determination module 6 and a termination module 7.

The collection module 3 is used for collecting images of external environment. Specifically, the collection module 3 may include a videotaping module which is used for collecting images of external environment by way of videotaping.

The obtaining module 5 is used for obtaining a first image and a second image according to the images of external environment collected by the collection module 3. Here, the first image refers to an image suspected to change suddenly; the second image refers to an image suspected to stop changing.

The first determination module 1 is used for determining whether or not the first image is changed.

The generation module 2 is used for generating a storage instruction when the first determination module 1 determines that the first image is changed.

The storage module 4 is used for storing images of external environment according to the storage instruction.

The second determination module 6 is used for determining whether or not the second image is changed.

The termination module 7 is used for stopping storing images of external environment when the second determination module 6 determines that the second image is not changed.

According to the embodiment of the present invention, the first determination module 1 may be specifically used for sequentially obtaining a difference between every two adjacent frames of images among the first image and at least a predetermined frame of image previous to the first image, then cumulatively adding the obtained differences to obtain a target moving dimension, and subsequently, determining whether or not the target moving dimension exceeds a target moving dimension threshold, so as to determine whether or not the first image is changed.

Specifically, among the first image and at least the predetermined frame of image previous to the first image, the first determination module 1 sequentially compares a latter frame of image with a former frame of image in every two adjacent frames of images, specifically obtains differences between pixel brightness values at same positions of the latter frame of image and the former frame of image, then cumulatively adds the obtained differences, and obtains the target moving dimension according to the result of the cumulative addition.

According to the embodiment of the present invention, the generation module 2 may be specifically used for generating a storage instruction when it is determined that the target moving dimension exceeds the target moving dimension threshold.

According to the embodiment of the present invention, the collection module 3 may further include a photographing module used for collecting images of external environment by way of photographing. In this case, the collection module 3 is used for collecting images of external environment by means of the videotaping module and the photographing module after receiving the storage instruction generated by the generation module 2. At this time, the storage module is used for storing the images of external environment collected by the videotaping module and the photographing module according to the storage instruction. In addition, the termination module 7 is further used for stopping the collection module 3 from collecting images of external environment by means of the photographing module so that the collection module 3 collects images of external environment only by means of the videotaping module, when the second determination module 6 determines that the second image is not changed.

According to the embodiment of the present invention, the second determination module 6 may determine whether or not the second image is changed by using the images collected by the videotaping module. Specifically, the second determination module 6 sequentially obtains a difference between every two adjacent frames of images among the second image and at least a predetermined frame of image previous to the second image, then cumulatively adds the obtained differences to obtain a target moving dimension, and subsequently, determines whether or not the target moving dimension exceeds a target moving dimension threshold, so as to determine whether or not the second image is changed.

According to the embodiment of the present invention, the termination module 7 is used for stopping storing images of external environment when it is determined that the target moving dimension does not exceed the target moving dimension threshold. The monitoring device provided by the present embodiment is used for implementing the above monitoring method according to the embodiment of the present invention.

The monitoring device provided by the present embodiment is used for implementing the above monitoring method according to the embodiment of the present invention, and the monitoring method includes: determining whether or not the first image is changed; generating a storage instruction if it is determined that the first image is changed; collecting and storing images of external environment according to the storage instruction; obtaining the second image according to the collected images of external environment; determining whether or not the second image is changed; stopping storing if it is determined that the second image is not changed. That is to say, in the monitoring device, when the second image is not changed, the second image and images subsequent thereto are not photographed and stored; when the scene in the image is changed, the photographing and storage functions may start working automatically, and when the scene in the image stops changing, the photographing and storage functions may stop working automatically. In this way, the storage space in the monitoring device is saved, thus the duration of shooting is prolonged, and in the meanwhile, related personnel can extract valuable videos and photographs quickly.

In a monitoring device according another embodiment of the present invention, the second determination module 6 may determine whether or not the second image is changed by using the images collected by the photographing module, and may determine whether or not the second image is changed specifically by any one method of sum of absolute values of corresponding pixel differences in an image sequence (Sum of Absolute Differences, SAD), sum of squares of corresponding pixel differences in an image sequence (Sum of Squared Differences, SSD), normalized cross correlation (NCC), and Census transformation.

Apparently, the monitoring device according to the embodiment of the present invention may have various modifications. For example, whether or not the second image is changed is determined by using images collected by both the photographing module and the videotaping module, respectively (for the determination methods, the description of the above embodiments may be referred to), wherein if the determination result as to whether or not the second image is changed is obtained by one of the two ways, the determination by the other way will be terminated automatically, for example, when the determination result as to whether or not the second image is changed has not been obtained by using the images collected by the photographing module, but it has been determined that the second image is not changed by using the images collected by the videotaping module, the storing is stopped.

The monitoring device provided by the embodiment of the present invention is used for implementing the monitoring method according to the embodiment of the present invention, and the monitoring method includes: determining whether or not the first image is changed; generating a storage instruction if it is determined that the first image is changed; collecting and storing images of external environment according to the storage instruction; obtaining the second image according to the collected images of external environment; determining whether or not the second image is changed; stopping storing if it is determined that the second image is not changed. That is to say, in the monitoring device, when the second image is not changed, the second image and images subsequent thereto are not photographed and stored; when the scene in the image is changed, the photographing and storage functions may start working automatically, and when the scene in the image stops changing, the photographing and storage functions may stop working automatically. In this way, the storage space in the monitoring device is saved, thus the duration of shooting is prolonged, and in the meanwhile, related personnel can extract valuable videos and photographs quickly.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as falling within the protection scope of the present invention.

The invention claimed is:

1. A monitoring method, comprising:
    determining whether or not a first image is changed;
    generating a storage instruction if it is determined that the first image is changed;
    collecting and storing images of an external environment according to the storage instruction;
    obtaining a second image according to the collected images of the external environment;
    determining whether or not the second image is changed; and
    stopping storing images of the external environment if it is determined that the second image is not changed,
    wherein, determining whether or not the first image is changed comprises:
    sequentially obtaining a difference between every two adjacent frames of images among the first image and a plurality of frames of images previous to the first image, and then cumulatively adding the obtained differences to obtain a first target moving dimension;
    determining whether or not the first target moving dimension exceeds a first target moving dimension threshold; and
    determining the first image is changed if it is determined that the first target moving dimension exceeds the first target moving dimension threshold.

2. The monitoring method according to claim 1, wherein, before determining whether or not a first image is changed, the monitoring method further comprises:
    collecting images of the external environment by way of videotaping, and obtaining the first image according to the collected images of the external environment.

3. The monitoring method according to claim 1, wherein, sequentially obtaining a difference between every two adjacent frames of images among the first image and the plurality of frames of images previous to the first image and then cumulatively adding the obtained differences comprises:
    among the first image and the plurality of frames of images previous to the first image, sequentially comparing a latter frame of image with a former frame of image in every two adjacent frames of images to obtain a difference between pixel brightness values at same positions of the latter frame of image and the former frame of image, and then cumulatively adding the obtained differences to obtain the first target moving dimension.

4. The monitoring method according to claim 1, wherein, collecting and storing images of the external environment according to the storage instruction comprises:
    collecting the images of the external environment by way of both videotaping and photographing, and storing the images collected by way of videotaping and photographing.

5. The monitoring method according to claim 4, further comprising: stopping using photographing to collect the images of the external environment if it is determined that the second image is not changed.

6. The monitoring method according to claim 4, wherein, whether or not the second image is changed is determined by using images collected by way of videotaping; and determining whether or not the second image is changed comprises:
    sequentially obtaining a difference between every two adjacent frames of images among the second image and a plurality of frames of images previous to the second image, and then cumulatively adding the obtained differences to obtain a second target moving dimension; and
    determining whether or not the second target moving dimension exceeds a second target moving dimension threshold; and
    stopping storing the images of the external environment if it is determined that the second image is not changed comprises:
    stopping storing the images of the external environment if the second target moving dimension does not exceed the second target moving dimension threshold.

7. The monitoring method according to claim 4, wherein, whether or not the second image is changed is determined by using images collected by way of photographing; and determining whether or not the second image is changed comprises:
    whether or not the second image is changed is determined by any one method of sum of absolute values of corresponding pixel differences in an image sequence, sum of squares of corresponding pixel differences in an image sequence, normalized cross correlation, and Census transformation.

8. The monitoring method according to claim 1, wherein, whether or not the second image is changed is determined by using images collected by way of videotaping; and determining whether or not the second image is changed comprises:

sequentially Obtaining a difference between every two adjacent frames of images among the second image and a plurality of frames of images previous to the second image, and then cumulatively adding the obtained differences to obtain a second target moving dimension; and determining whether or not the second target moving dimension exceeds a second target moving dimension threshold; and stopping storing the images of the external environment if it is determined that the second image is not changed comprises:

stopping storing the images of the external environment if the second target moving dimension does not exceed the second target moving dimension threshold.

* * * * *